US012623293B2

(12) United States Patent
Volk et al.

(10) Patent No.: US 12,623,293 B2
(45) Date of Patent: May 12, 2026

(54) TOOL HOLDER HAVING A CYLINDRICAL FIXATION BORE EXTENDING REARWARDLY FROM A FRONT FIXATION SURFACE AND A FASTENING BORE INTERSECTING THE FRONT FIXATION SURFACE

(71) Applicant: ISCAR, LTD., Tefen (IL)

(72) Inventors: Herbert Volk, Vaihingen-Horrheim (DE); Patrick Schöffel, Vaihingen-Horrheim (DE)

(73) Assignee: Iscar, Ltd., Tefen (IL)

( * ) Notice: Subject to any disclaimer, the term of this patent is extended or adjusted under 35 U.S.C. 154(b) by 445 days.

(21) Appl. No.: 18/302,748

(22) Filed: Apr. 18, 2023

(65) Prior Publication Data

US 2023/0364687 A1      Nov. 16, 2023

Related U.S. Application Data

(60) Provisional application No. 63/342,200, filed on May 16, 2022.

(51) Int. Cl.
*B23B 29/04*      (2006.01)
*B23B 31/20*      (2006.01)
*F16D 1/08*      (2006.01)

(52) U.S. Cl.
CPC ............ *B23B 29/04* (2013.01); *B23B 31/201* (2013.01); *B23B 2270/06* (2013.01); *F16D 1/0864* (2013.01)

(58) Field of Classification Search
CPC ....... B23B 49/04; B23B 49/14; B23B 49/025; B23B 31/201; B23B 2270/06;
(Continued)

(56) References Cited

U.S. PATENT DOCUMENTS 1,314,911 A  *  9/1919  Stephenson ............. B23B 29/04
                                                                      407/91
2,711,664 A  *  6/1955  Misuraca ................ B23B 29/04
                                                                      82/161
(Continued)

FOREIGN PATENT DOCUMENTS

DE          8311045 U1     9/1983
DE     102019115595 A1 * 12/2020    ............. B23B 29/04
(Continued)

OTHER PUBLICATIONS

International Search Report dated Jul. 21, 2023, issued in PCT counterpart application No. PCT/IL2023/050403.
(Continued)

*Primary Examiner* — Ryan Rufo
(74) *Attorney, Agent, or Firm* — Womble Bond Dickinson (US) LLP

(57) ABSTRACT

A tool holder has a holder body, a first clamping member, and a first fastening member. The holder body includes a fixation portion and a mounting portion located rearward of the fixation portion. The fixation portion has a front fixation surface facing in a forward direction, a cylindrical fixation bore opening out to the front fixation surface and extending rearwardly therefrom, and a longitudinally extending primary slot connecting the fixation bore to a fixation envelope surface. The first clamping member occupies a first clamping bore and traverses the primary slot. The first fastening member occupies a first fastening bore which intersects the first clamping bore and opens out to the front fixation surface. The fixation bore has a fixation bore first primary diameter which decreases and increases when the first fastening member is rotated in first fastening and first unfastening directions about the first fastening member axis, respectively.

22 Claims, 7 Drawing Sheets

(58) Field of Classification Search
CPC ........... F16D 1/0864; Y10T 279/17376; Y10T 279/17471; Y10T 279/17333; Y10T 408/2286
See application file for complete search history.

(56) References Cited

U.S. PATENT DOCUMENTS

| | | | |
|---|---|---|---|
| 3,377,685 A | 4/1968 | Carlstedt | |
| 4,211,510 A | 7/1980 | Hopkins | |
| 5,417,500 A * | 5/1995 | Martinie | F16D 1/0864 |
| | | | 384/537 |
| 5,997,012 A * | 12/1999 | Brian | B23B 31/201 |
| | | | 279/43.3 |
| 6,413,006 B1 * | 7/2002 | Neugart | F16D 1/04 |
| | | | 74/DIG. 10 |
| 6,648,514 B2 * | 11/2003 | Cevasco | F16D 1/0864 |
| | | | 384/537 |
| 6,908,264 B1 * | 6/2005 | Gundy | B28D 1/041 |
| | | | 125/20 |

| | | | |
|---|---|---|---|
| 8,740,511 B2 * | 6/2014 | Hecht | B23B 27/1666 |
| | | | 407/107 |
| 9,291,205 B2 * | 3/2016 | Widenmeyer | F16D 1/0864 |
| 9,656,326 B2 * | 5/2017 | Sadikov | B23B 27/1666 |
| 2009/0202314 A1 | 8/2009 | Okita et al. | |
| 2013/0149054 A1 * | 6/2013 | Hecht | B23B 29/043 |
| | | | 29/515 |
| 2014/0321926 A1 * | 10/2014 | Sadikov | B23B 27/1666 |
| | | | 407/107 |

FOREIGN PATENT DOCUMENTS

| | | | | |
|---|---|---|---|---|
| EP | 0 012 211 A1 | 6/1980 | | |
| GB | 136081 A | * 12/1919 | ............ | B23B 29/04 |
| KR | 20090076202 A | * 7/2009 | ............ | B23B 29/12 |

OTHER PUBLICATIONS

Written Opinion dated Jul. 21, 2023, issued in PCT counterpart application No. PCT/IL2023/050403.

* cited by examiner

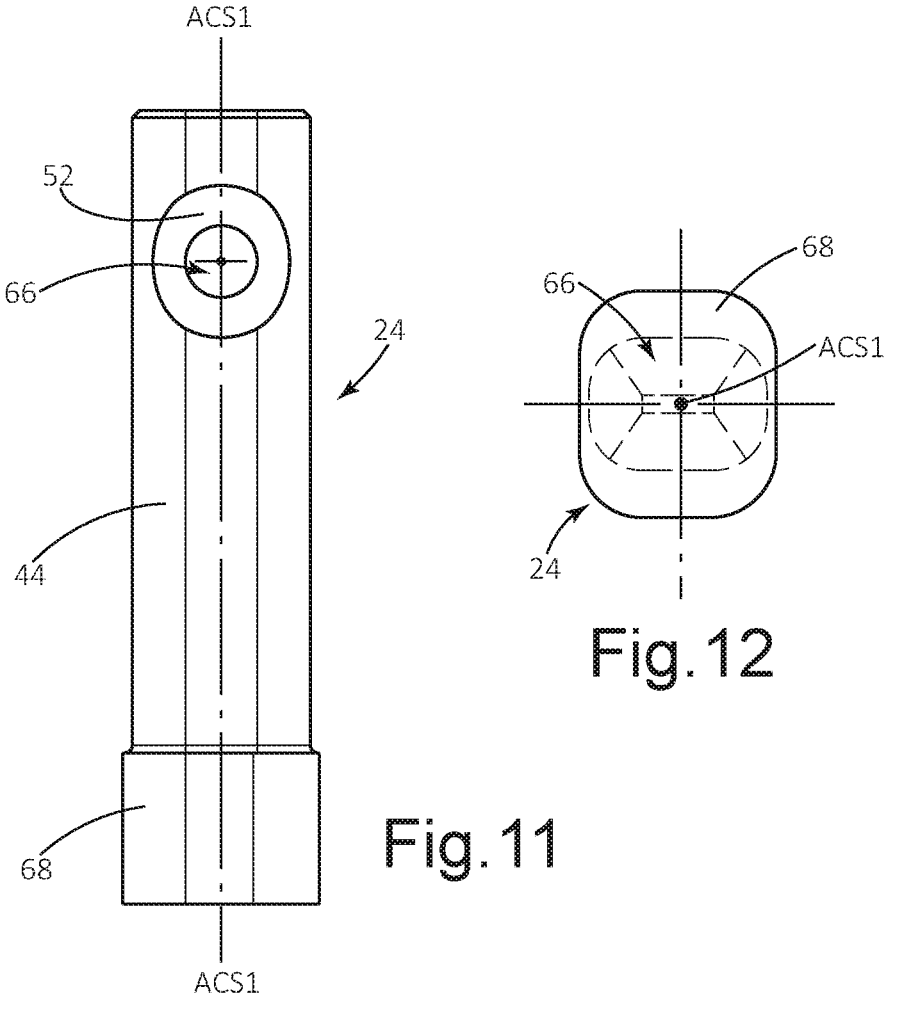
Fig.12
Fig.11
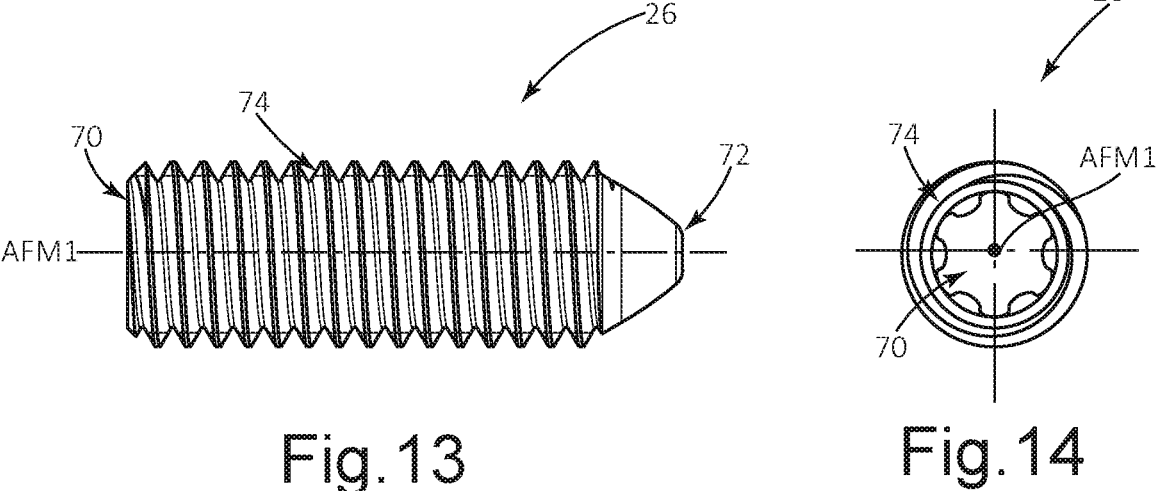
Fig.13
Fig.14

TOOL HOLDER HAVING A CYLINDRICAL FIXATION BORE EXTENDING REARWARDLY FROM A FRONT FIXATION SURFACE AND A FASTENING BORE INTERSECTING THE FRONT FIXATION SURFACE

RELATED APPLICATIONS

Priority is claimed to U.S. Provisional Patent Application No. 63/342,200 filed May 16, 2022. The contents of the aforementioned application are incorporated by reference in their entirety.

FIELD OF THE INVENTION

The present invention relates to a tool holder, and a cutting tool comprising the tool holder and a tool shank, for use in metal cutting processes in general, and more specifically for turning and drilling operations in which the cutting tool is static.

BACKGROUND OF THE INVENTION

Within the field of tool holders used in turning and drilling operations in which the cutting tool is static, there are some examples of tool holders configured to clampingly receive cylindrical tool shanks.

DE 8311045 U1 discloses a tool holder for cylindrical tool shanks, and in particular for boring bars, with a clamping head which is slotted to form mutually adjustable clamping jaws, and a bushing that can be received into the chuck of a machine tool. The clamping head has a cylindrical bore which together with the slot extends the entire length of the clamping head and the bushing. The clamping jaws are adjusted relative to one another by two screws which traverse the slot in the region of the clamping head.

US 2009/202314 A1 discloses a holder for a boring tool, which is formed from a sleeve and has increased stability of holding a cutting element to improve processing accuracy of the boring tool and to prevent chipping of a cutting edge. In the sleeve of the holder, the bar-like cutting element is inserted in a center hole in the sleeve and is held clamped by clamp means. A slit is provided in that portion of the sleeve which is from the forward end of the sleeve to the longitudinal middle of the sleeve, and the slit lies in a region from the center hole of the sleeve to its outer peripheral surface. Further, the holder has a fastener for tightening the slit portion of the sleeve to change the inner diameter of the center hole.

It is an object of the present invention to provide an improved tool holder.

It is also an object of the present invention to provide an improved tool holder having a cylindrical fixation bore in its front end.

It is a further object of the present invention to provide an improved tool holder having a fastening member easily accessible from its front end.

It is yet a further object of the present invention to provide an improved tool holder having a compactly configured front end fixation portion.

SUMMARY OF THE INVENTION

In accordance with the present invention, there is provided a tool holder having a longitudinal axis defining a forward-to-rear direction, and comprising a holder body, a first clamping member, and a first fastening member, the holder body having a fixation portion and a mounting portion located rearward of the fixation portion, the fixation portion having a front fixation surface facing in the forward direction, a cylindrical fixation bore intersecting the front fixation surface and extending rearwardly therefrom along the longitudinal axis, a fixation envelope surface extending rearwardly from the front fixation surface, and a longitudinally extending primary slot connecting the fixation bore to the fixation envelope surface and intersecting the front fixation surface, the first clamping member having a first clamping shaft extending along a first clamping shaft axis, the first clamping shaft occupying a first clamping bore in the fixation portion and traversing the primary slot, and the first fastening member extending along a first fastening member axis and occupying a first fastening bore in the fixation portion, the first fastening bore intersecting the first clamping bore and opening out to the front fixation surface, wherein in a cross-section taken in a first fixation plane perpendicular to the longitudinal axis and intersecting the primary slot, the fixation bore has a fixation bore first primary diameter measured parallel to the first clamping shaft axis or an axial projection thereof, and wherein:

rotation of the first fastening member in a first fastening direction about the first fastening member axis causes the first fastening member to operatively engage a first abutment surface of the first clamping shaft and the fixation bore first primary diameter to decrease, and subsequent rotation of the first fastening member in a first unfastening direction opposite to the first fastening direction about the first fastening member axis causes the first fastening member to operatively disengage from the first abutment surface of the first clamping shaft and the fixation bore first primary diameter to increase.

BRIEF DESCRIPTION OF THE DRAWINGS

For a better understanding, the invention will now be described, by way of example only, with reference to the accompanying drawings in which:

FIG. 11 is a side view of a first clamping member in accordance with some embodiments of the present invention;

FIG. 12 is an end view of the first clamping member shown in FIG. 11;

FIG. 13 is a side view of a first fastening member in accordance with some embodiments of the present invention;

FIG. 14 is an end view of the first fastening member shown in FIG. 13;

DETAILED DESCRIPTION OF THE INVENTION

Figure 1:
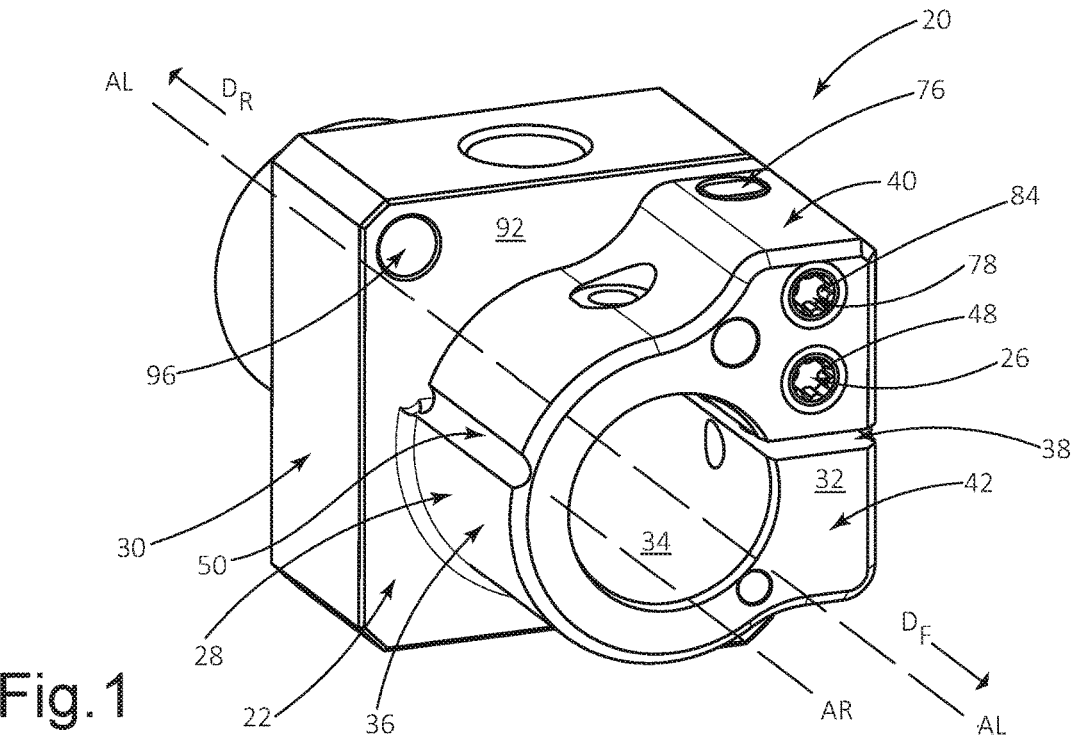
FIG. 1 is a first perspective view from the front of a tool holder in accordance with some embodiments of the present invention.

As shown in FIGS. 1 to 7, the present invention relates to a tool holder 20 having a longitudinal axis AL defining a forward-to-rear direction DF, DR, and comprising a holder body 22, a first clamping member 24, and a first fastening member 26. The holder body 22 has a fixation portion 28 and a mounting portion 30 located rearward of the fixation portion 28 (i.e. along the longitudinal axis AL.

In some embodiments of the present invention, the holder body 22 may be manufactured from hardened steel.

As shown in FIGS. 1 to 7, the fixation portion 28 has a front fixation surface 32 facing in the forward direction DF, a cylindrical fixation bore 34 intersecting the front fixation surface 32 and extending rearwardly therefrom along the longitudinal axis AL, and a fixation envelope surface 36 extending rearwardly from the front fixation surface 32.

In some embodiments of the present invention, the front fixation surface 32 may be perpendicular to the longitudinal axis AL, at least in the region of intersection by the fixation bore 34.

Also, in some embodiments of the present invention, no portion of the fixation portion 28 may extend forward of the front fixation surface 32 (i.e. along the longitudinal axis AL).

Further, in some embodiments of the present invention, the fixation bore 34 may be a through bore extending the entire longitudinal extent of the holder body 22.

Figure 3:
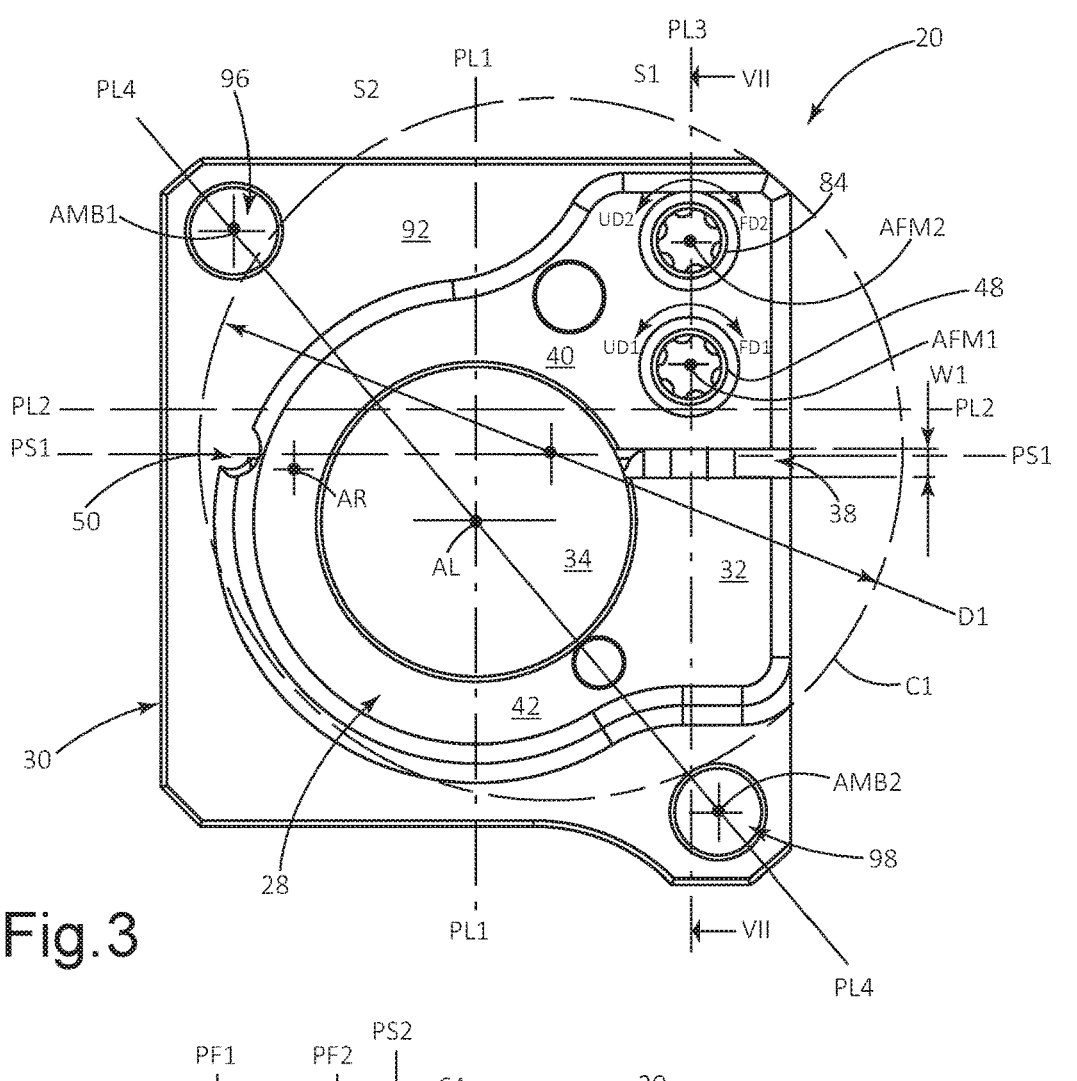
FIG. 3 is a front view of the tool holder shown in FIG. 1.
Figure 4:
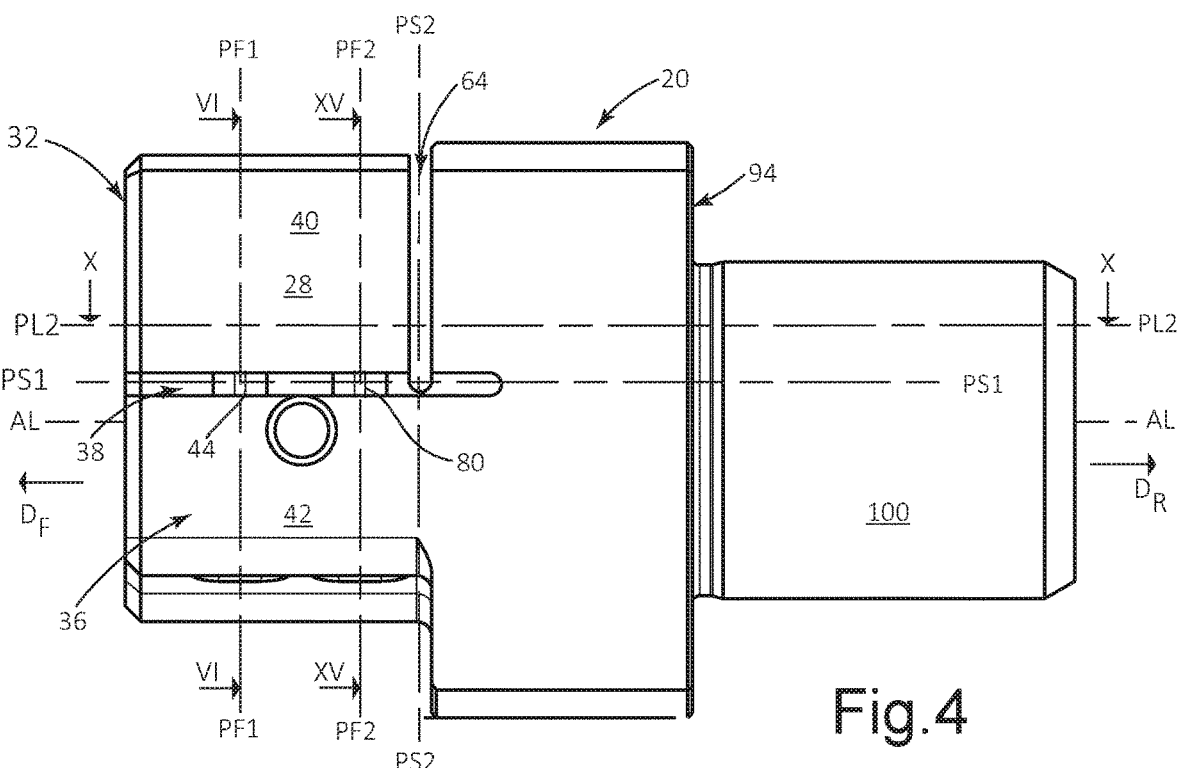
FIG. 4 is a side view of the tool holder shown in FIG. 1.

As shown in FIGS. 3 and 4, a longitudinally extending primary slot 38 connects the fixation bore 34 to the fixation envelope surface 36 and intersects the front fixation surface 32.

In some embodiments of the present invention, the fixation portion 28 may have a resiliently displaceable fixation jaw 40 and a static base jaw 42, and the fixation jaw 40 and the base jaw 42 may be spaced apart by the primary slot 38.

As shown in FIGS. 3 and 4, a primary slot plane PS1 may be disposed in the primary slot 38 between the fixation jaw 40 and the base jaw 42.

In some embodiments of the present invention, the primary slot plane PS1 may be parallel to and offset from the longitudinal axis AL. Thus, as seen in FIG. 3, the primary slot plane PS1, and the primary slot 38, may extend in a tangential direction, rather than a radial direction, from the fixation bore 34 to the fixation envelope surface 36.

Figure 6:
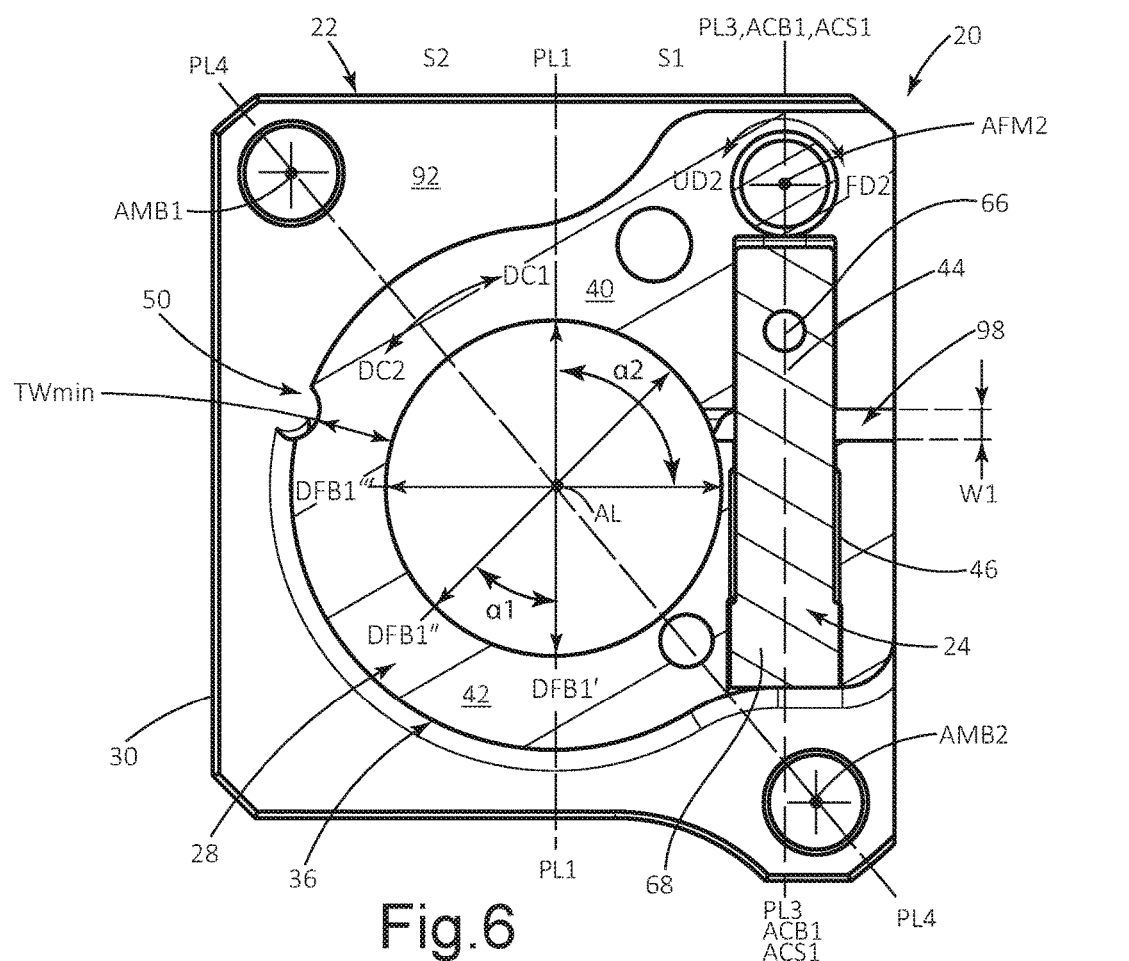
FIG. 6 is a cross-sectional view of the tool holder shown in FIG. 4, taken along the line VI-VI.
Figure 7:
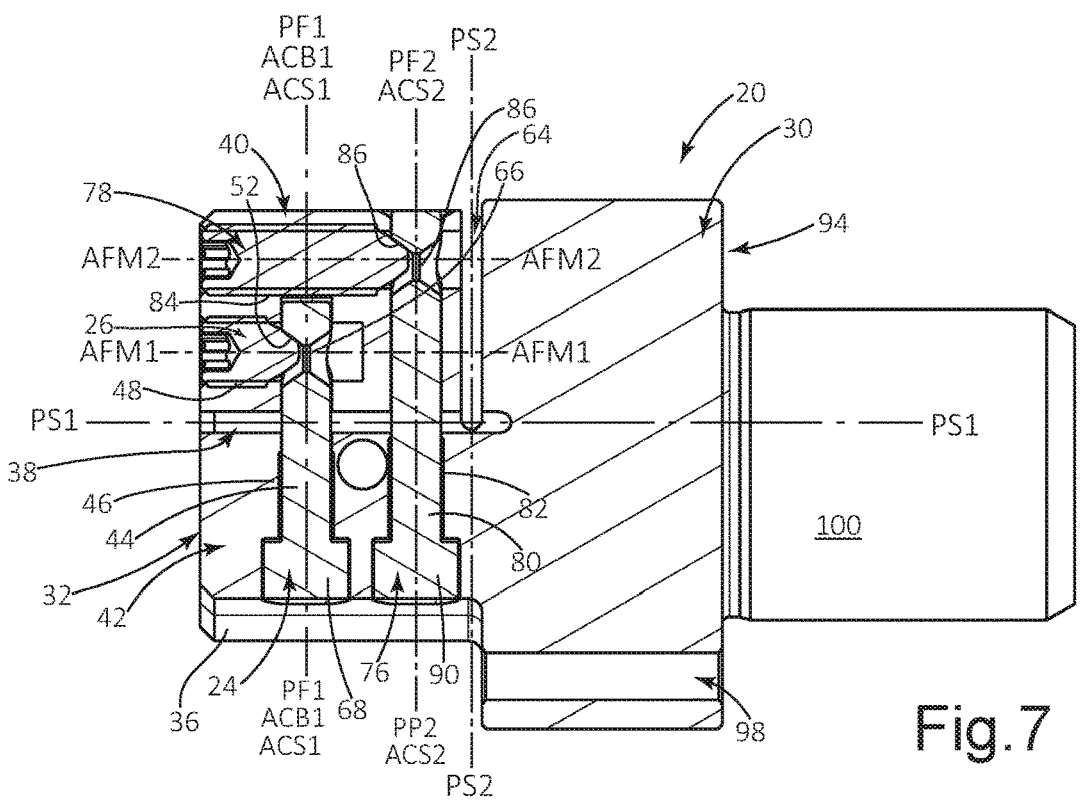
FIG. 7 is a cross-sectional view of the tool holder shown in FIG. 3, taken along the line VII-VII.

As shown in FIGS. 6 and 7, the first clamping member 24 has a first clamping shaft 44 extending along a first clamping shaft axis ACS1, and the first clamping shaft 44 occupies a first clamping bore 46 in the fixation portion 28 and traverses the primary slot 38.

In some embodiments of the present invention, the first clamping shaft 44 may be non-threadingly retained in the first clamping bore 46.

As shown in FIG. 6, in a cross-section taken in a first fixation plane PF1 perpendicular to the longitudinal axis AL and intersecting the primary slot 38, the fixation bore 34 has a fixation bore first primary diameter DFB1' measured parallel to the first clamping shaft axis ACS1 or to an axial projection thereof.

Also as shown in FIG. 6, in the cross-section taken in the first fixation plane PF1, the fixation bore 34 has a fixation bore first secondary diameter DFB1" measured at a first fixation first rotational offset angle $\alpha 1$ of forty-five degrees from the fixation bore first primary diameter DFB1', and fixation bore first tertiary diameter DFB1''' measured at a first fixation second rotational offset angle $\alpha 2$ of ninety degrees from the fixation bore first primary diameter DFB1'.

It should be appreciated that each of the fixation bore first primary, secondary and tertiary diameters DFB1', DFB1", DFB1''' contains and is measured via the longitudinal axis AL.

In a tool holder 20 in which the fixation jaw 40 is not being resiliently displaced relative to the base jaw 42, apart from the circumferential portion of the fixation bore 34 being intersected by the primary slot 38, the fixation bore 34 may have a circular cross-section shape and the fixation bore first primary, secondary and tertiary diameters DFB1', DFB1", DFB1''' may be equal.

In some embodiments of the present invention, the first clamping shaft axis ACS1 may be contained in the first fixation plane PF1.

As shown in FIG. 6, in the cross-section taken in the first fixation plane PF1, the primary slot 38 may have a primary slot width W1 measured parallel to the first clamping shaft axis ACS1 or to an axial projection thereof.

In some embodiments of the present invention, the primary slot width W1 may be less than twenty percent of the fixation bore first primary diameter DFB1', i.e. W1<0.20*DFB1'.

As shown in FIG. 7, the first fastening member 26 extends along a first fastening member axis AFM1 and occupies a first fastening bore 48 in the fixation portion 28.

In some embodiments of the present invention, the first fastening bore 48 may be a threaded bore, and the first fastening member 26 may be threadingly retained in the first fastening bore 48.

As shown in FIG. 7, the first fastening bore 48 intersects the first clamping bore 46 and opens out to the front fixation surface 32.

In some embodiments of the present invention, the front fixation surface 32 may be perpendicular to the longitudinal axis AL in the region of where the first fastening bore 48 opens out to the front fixation surface 32.

It should be appreciated that by virtue of the first fastening bore 48 opening out to the front fixation surface 32, the first fastening bore 48 is configured to receive the first fastening member 26, which may thus be accessible (by an operator) from a location forward of the front fixation surface 32.

As shown in FIG. 3, in a front view of the holder body 22, an imaginary first circle C1 having a first diameter D1 circumscribes the fixation portion 28.

In some embodiments of the present invention, the center of the imaginary first circle C1 may be non-coincident with the longitudinal axis AL.

Also, in some embodiments of the present invention, the fixation bore first primary diameter DFB1' may be greater than thirty percent of the first diameter D1, i.e. DFB1'>0.30*D1. For such embodiments of the invention, it should be appreciated that despite the fixation bore 34 and the first fastening bore 48 opening out to the front fixation surface 32, in a front view of the holder body 22, as shown in FIG. 3, the fixation portion 28 is radially compact.

As shown in FIGS. 3 and 7, the first fastening bore 48 may be located in the fixation jaw 40.

In some embodiments of the present invention, the first fastening member axis AFM1 may be parallel to the longitudinal axis AL.

For embodiments of the invention in which the first fastening member axis AFM1 is parallel to the longitudinal axis AL and the first clamping shaft axis ACS1 is contained in the first fixation plane PF1, it should be appreciated that the first fastening member axis AFM1 is perpendicular to the first clamping shaft axis ACS1.

As shown in FIGS. 1 and 3, the fixation jaw 40 may be resiliently displaceable about a resilient axis of rotation AR extending parallel to the longitudinal axis AL.

Also as shown in FIG. 3, the primary slot 38 may be located on a first side S1 of a first longitudinal plane PL1 containing the longitudinal axis AL, and the resilient axis of rotation AR may be located on an opposite second side S2 of the first longitudinal plane PL1.

In some embodiments of the present invention, the first clamping bore 46 and the first fastening bore 48 may be located on the first side S1 of the first longitudinal plane PL1.

Also, in some embodiments of the present invention, the first longitudinal plane PL1 may be parallel to the first clamping shaft axis ACS1.

As shown in FIG. 6, in the cross-section taken in the first fixation plane PF1, the resilient axis of rotation AR may be located in the vicinity of a minimum fixation wall thickness $TW_{MIN}$ between the fixation envelope surface 36 and the fixation bore 34.

Also as shown in FIG. 6, the fixation jaw 40 may extend away from the resilient axis of rotation AR in a first circumferential direction DC1 about the fixation bore 34 and the base jaw 42 may extend away from the resilient axis of rotation AR in a second circumferential direction DC2 opposite to the first circumferential direction DC1 about the fixation bore 34.

In some embodiments of the present invention, as shown in FIGS. 1, 3 and 6, the fixation envelope surface 36 may have a longitudinal groove 50 extending parallel to the longitudinal axis AL, and the minimum fixation wall thickness $TW_{MIN}$ may be measured between the longitudinal groove 50 and the fixation bore 34.

Also, in some embodiments of the present invention, the primary slot plane PS1 may intersect the longitudinal groove 50.

Rotation of the first fastening member 26 in a first fastening direction FD1 about the first fastening member axis AFM1 causes the first fastening member 26 to operatively engage a first abutment surface 52 of the first clamping shaft 44 and the fixation bore first primary diameter DFB1' to decrease.

Also, rotation of the first fastening member 26 in the first fastening direction FD1 about the first fastening member axis AFM1 causes the primary slot width W1 to decrease.

It should be appreciated that during rotation of the first fastening member 26 in the first fastening direction FD1 about the first fastening member axis AFM1, the fixation jaw

Figure 9:
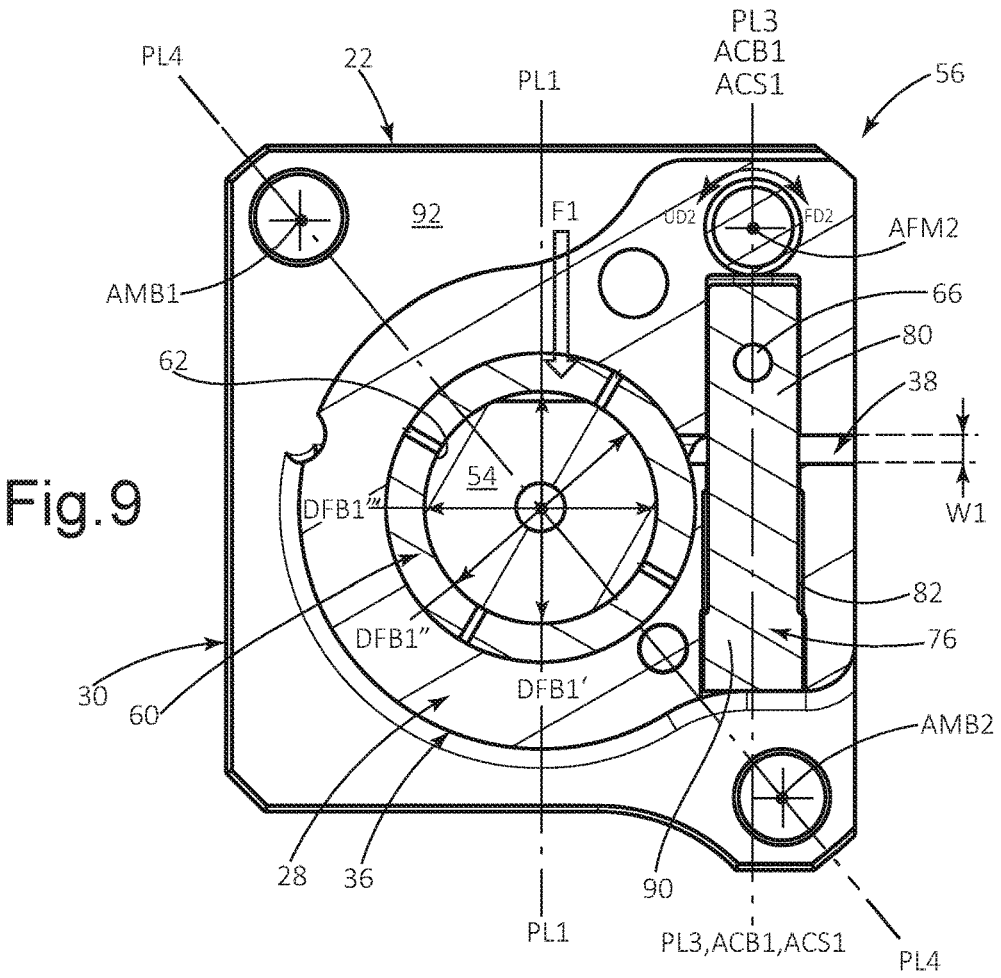
FIG. 9 is the cross-sectional view of the tool holder shown in FIG. 4, taken along the line VI-VI, with the radially expandable sleeve and the tool shank clampingly retained therein.

40 undergoes resilient displacement relative to the base jaw 42, and as shown in FIG. 9, a first clamping force F1 may be applied to a cylindrical tool shank 54 occupying the fixation bore 34.

Following rotation of the first fastening member 26 in the first fastening direction FD1 about the first fastening member axis AFM1, the tool shank 54 may be clampingly retained in the holder's fixation bore 34 to form a cutting tool 56.

Figure 8:
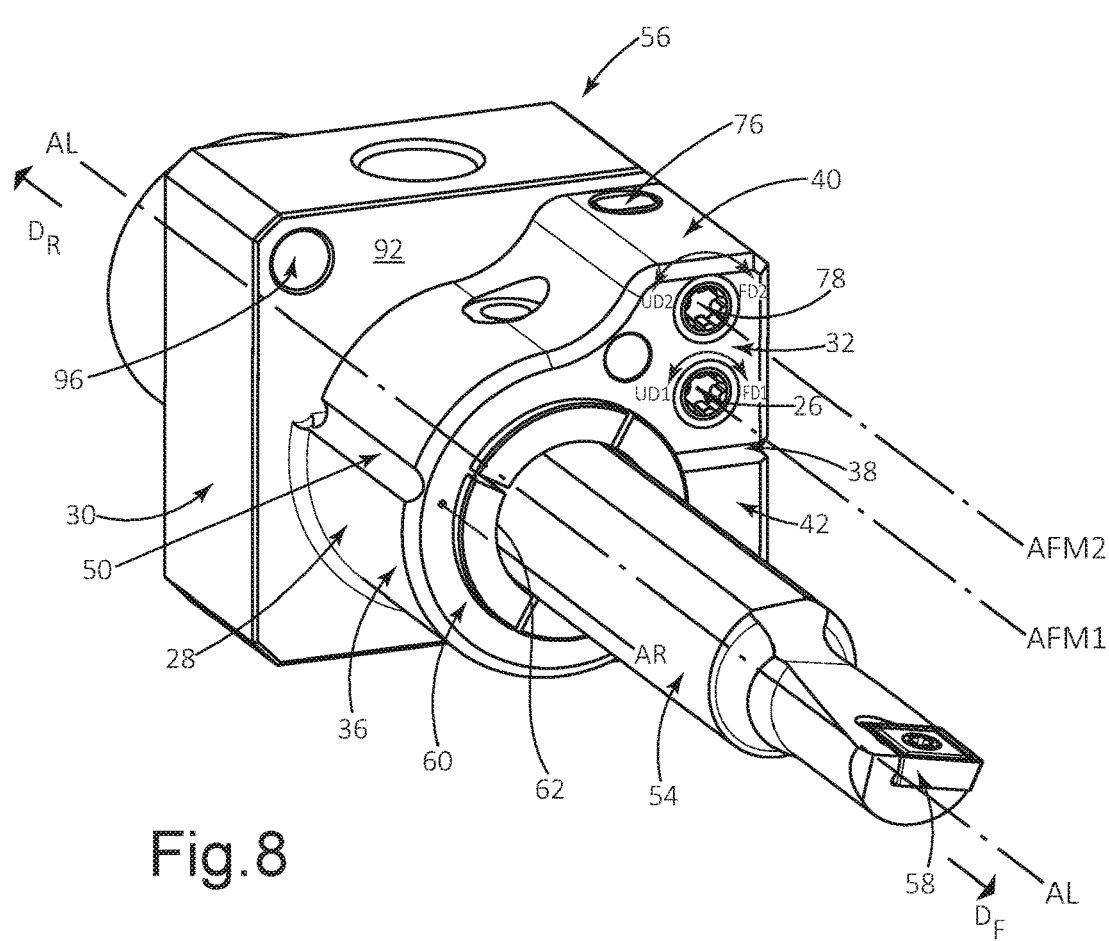
FIG. 8 is the first perspective view of the tool holder shown in FIG. 1, with a radially expandable sleeve and a tool shank clampingly retained therein.

It should be appreciated that the cutting tool 56 may have several possible configurations, including, for example, a turning tool shank 54 with a replaceable cutting insert 58, as shown in FIG. 8, or a unitary one-piece drill shank with integral cutting head (not shown).

Also, following rotation of the first fastening member 26 in the first fastening direction FD1 about the first fastening member axis AFM1, it should be appreciated that although the fixation bore first primary diameter DFB1' has decreased, the fixation bore first primary diameter DFB1' may remain greater than thirty percent of the first diameter D1.

In some embodiments of the present invention, rotation of the first fastening member 26 in the first fastening direction FD1 about the first fastening member axis AFM1 also causes the fixation bore first secondary diameter DFB1" to decrease. However, the resilient displacement of the fixation jaw 40 relative to the base jaw 42 may be of a smaller magnitude at the first fixation first rotational offset angle α1 of forty-five degrees from the fixation bore first primary diameter DFB1', and thus following rotation of the first fastening member 26 in the first fastening direction FD1 about the first fastening member axis AFM1, the fixation bore first secondary diameter DFB1" may be greater than the fixation bore first primary diameter DFB1'.

Also, in some embodiments of the present invention, as shown in FIG. 6, by virtue of the fixation bore first tertiary diameter DFB1''' being measured solely between two points on the base jaw 42, rotation of the first fastening member 26 in the first fastening direction FD1 about the first fastening member axis AFM1 may cause no change to the fixation bore first tertiary diameter DFB1'''.

Further, in some embodiments of the present invention, as shown in FIGS. 8 and 9, a radially expandable sleeve 60 may occupy the fixation bore 34, and the tool shank 54 may be clampingly retained in the fixation bore 34 via the sleeve 60. Differences between the fixation bore first primary, secondary and tertiary diameters DFB1', DFB1", DFB1''' following rotation of the first fastening member 26 in the first fastening direction FD1 about the first fastening member axis AFM1 are compensated for by the sleeve 60 such that the first clamping force F1 is circumferentially distributed around the tool shank 54 and an inner sleeve surface 62 of the sleeve 60 having a substantially circular cross-sectional shape makes clamping contact therewith.

It should be appreciated that several radially expandable sleeves 60 having different internal diameters may be provided, whereby an 'appropriately sized' sleeve 60 may be inserted into the fixation bore 34 depending on the diameter of the tool shank 54 to be circumferentially clamped therein.

It should also be appreciated that the tool holder 20 may be advantageously used in CNC machines with spatial constraints requiring a plurality of cutting tools 56 to be positioned in close proximity, for example, swiss type machines having several rows of cutting tools 56 arranged side-by-side on a static back plate (not shown). For such CNC machine set-ups where side access may be problematic, the first fastening member 26 of each tool holder 20 is advantageously accessible from a location forward of each front fixation surface 32.

For embodiments of the present invention in which the fixation bore 34 is a through bore, it should further be appreciated that the overhang extent of each tool shank 54 forward of its front fixation surface 32 is adjustable, such that for swiss type machines having several rows of cutting tools 56 with different shank lengths and configurations, the overhang extent of the plurality of operative cutting tips associated with the tool shanks 54 may be advantageously adjusted to lie in an imaginary plane.

Subsequent rotation of the first fastening member 26 in a first unfastening direction UD1 opposite to the first fastening direction FD1 about the first fastening member axis AFM1 causes the first fastening member 26 to operatively disengage from the first abutment surface 52 of the first clamping shaft 44 and the fixation bore first primary diameter DFB1' to increase.

Also, subsequent rotation of the first fastening member 26 in the first unfastening direction UD1 about the first fastening member axis AFM1 causes the primary slot width W1 to increase.

In some embodiments of the present invention, subsequent rotation of the first fastening member 26 in the first unfastening direction UD1 about the first fastening member axis AFM1 also causes the fixation bore first secondary diameter DFB1" to increase.

Following sufficient rotation of the first fastening member 26 in the first unfastening direction UD1 about the first fastening member axis AFM1, the fixation jaw 40 is no longer being resiliently displaced relative to the base jaw 42, and the fixation bore first primary, secondary and tertiary diameters DFB1', DFB1", DFB1''' may be equal.

Figure 5:
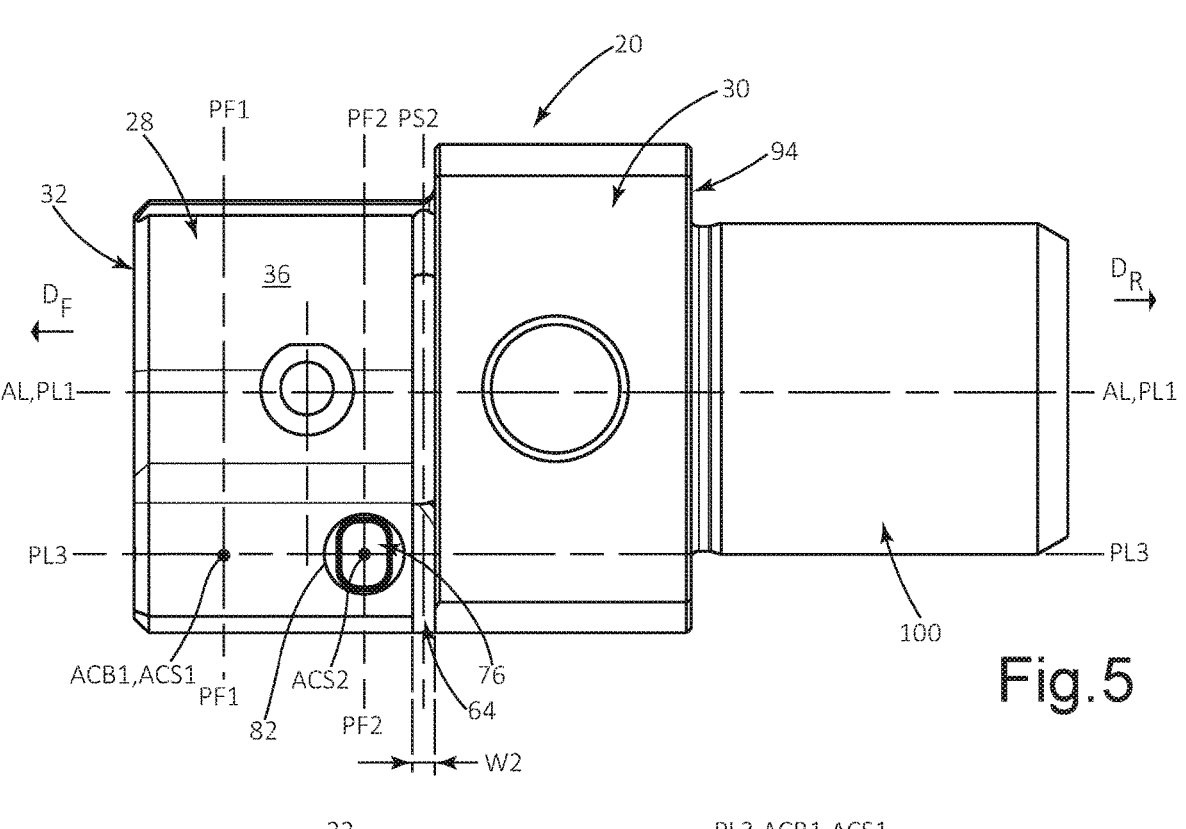
FIG. 5 is a top view of the tool holder shown in FIG. 1.

As shown in FIGS. 4 and 5, the fixation jaw 40 may be spaced apart from the mounting portion 30 by a secondary slot 64 transverse to the primary slot 38.

In some embodiments of the present invention, the secondary slot 64 may communicate with the primary slot 38.

Also, in some embodiments of the present invention, the secondary slot 64 may be located rearward of the first fixation plane PF1.

Further, in some embodiments of the present invention, the radially expandable sleeve 60 occupying the fixation bore 34 may extend rearwardly from the front fixation surface 32 and intersect the secondary slot 64.

Figure 10:
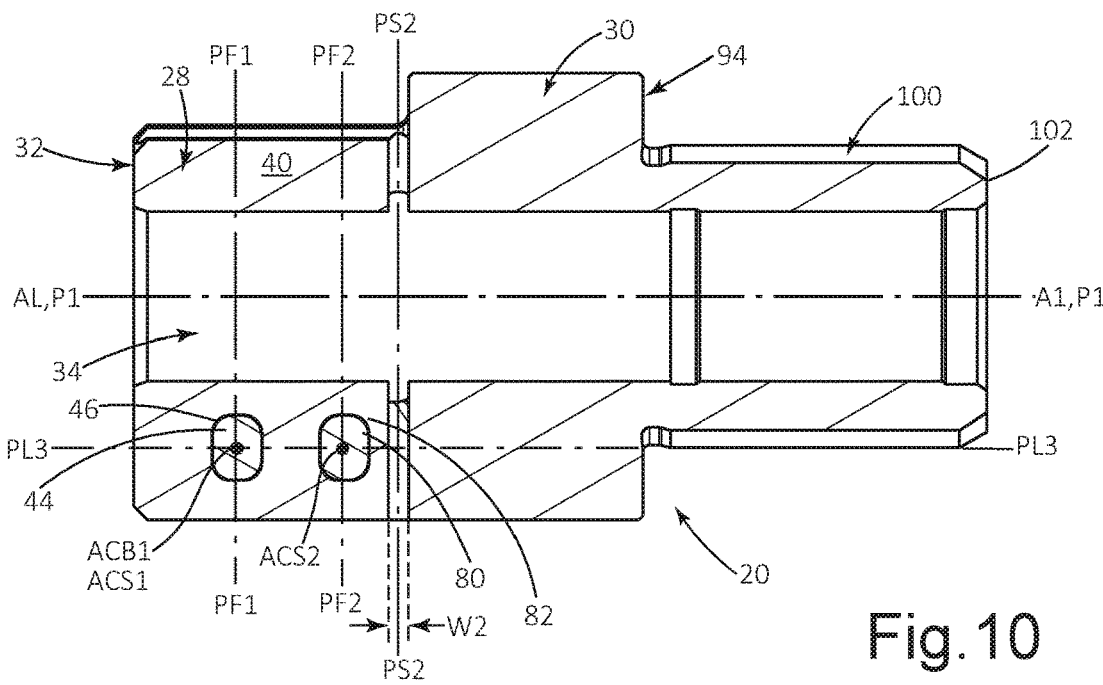
FIG. 10 is a cross-sectional view of the tool holder shown in FIG. 4, taken along the line X-X.

As shown in FIG. 10, in a cross-section taken in a second longitudinal plane PL2 parallel to the primary slot plane PS1 and intersecting the fixation jaw 40, the mounting portion 30 and the fixation jaw 40 may be entirely spaced apart by the secondary slot 64.

In some embodiments of the present invention, in a cross-section taken in any plane parallel to the primary slot plane PS1 and intersecting the fixation jaw 40, the mounting portion 30 and the fixation jaw 40 may be entirely spaced apart by the secondary slot 64.

As shown in FIG. 4, the base jaw 42 may merge with, or be integrally connected to, the mounting portion 30.

As shown in FIGS. 4 and 5, a secondary slot plane PS2 may be disposed in the secondary slot 48 between the fixation jaw 40 and the mounting portion 30.

In some embodiments of the present invention, the secondary slot plane PS2 may be perpendicular to the longitudinal axis AL.

Also, in some embodiments of the present invention, the secondary slot plane PS2 may be perpendicular to the primary slot plane PS1.

As shown in FIG. 5, in a top view of the holder body 22, the secondary slot 64 may have a secondary slot width W2 measured perpendicular to the secondary slot plane PS2.

In some embodiments of the present invention, rotation of the first fastening member 26 in the first fastening direction FD1 or the first unfastening direction UD2 about the first fastening member axis AFM1 may cause no change to the secondary slot width W2.

As shown in FIGS. 7, 11 and 12, the first abutment surface 52 may be disposed in a first abutment recess 66 in the first clamping shaft 44.

In some embodiments of the present invention, the first clamping member 24 may have a first clamping head 68 at one end of the first clamping shaft 44, and, as shown in FIG. 7, the first abutment recess 66 and the first clamping head 68 may be located on opposite sides of the primary slot 38.

Also, in some embodiments of the present invention, the first abutment surface 52 may generally face towards the first clamping head 68. More specifically, at least a portion of the first abutment surface 52 may be sloped and have a surface facing towards the first clamping head 68.

Further, in some embodiments of the present invention, as shown in FIG. 7, the first clamping bore 46 may open out to a portion of the fixation envelope surface 36 associated with the base jaw 42, thus being configured to receive the first clamping member 24 via the base jaw 42.

As shown in FIGS. 13 and 14, the first fastening member 26 may have first and second fastening ends 70, 72 and a threaded fastening portion 74 extending along the first fastening member axis AFM1 between the first and second fastening ends 70, 72.

In some embodiments of the present invention, the first fastening end 70 may have a recessed or protruding torque transfer geometry, e.g., TORX™ or ALLEN™ accessible from a location forward of the front fixation surface 32.

Also, in some embodiments of the present invention, the second fastening end 72 may have a generally frusto-conical shape, and the second fastening end 72 may operatively engage the first abutment surface 52 of the first clamping shaft 44.

As shown in FIG. 10, the first clamping shaft 44 may be non-circular in a cross-section taken along the first clamping shaft axis ACS1.

In some embodiments of the present invention, the first clamping shaft 44 may have an oblong shape in the cross-section taken along the first clamping shaft axis ACS1.

Also, in some embodiments of the present invention, the first clamping bore 40 may extend along a first clamping bore axis ACB1 coaxial with the first clamping shaft axis ACS1, and the first clamping bore 46 may have a cross-sectional shape corresponding with the cross-sectional shape of the first clamping shaft 44 in a cross-section taken along the first clamping bore axis ACB1. For such embodiments of the present invention, it should be appreciated that the first clamping member 26 is non-rotatable about its first clamping shaft axis ACS1 in the first clamping bore 46, thus advantageously enabling the first fastening member's second fastening end 72 to reliably connect with the first clamping shaft's first abutment recess 66 and operatively engage the first abutment surface 52.

As shown in FIGS. 1 to 7, the tool holder 20 may further include a second clamping member 76 and a second fastening member 78.

As shown in FIG. 7, the second clamping member 76 may have a second clamping shaft 80 extending along a second clamping shaft axis ACS2, and the second clamping shaft 80 may occupy a second clamping bore 82 in the fixation portion 28 and traverse the primary slot 38.

In some embodiments of the present invention, the second clamping shaft 80 may be non-threadingly retained in the second clamping bore 82.

Figures 15, 16:
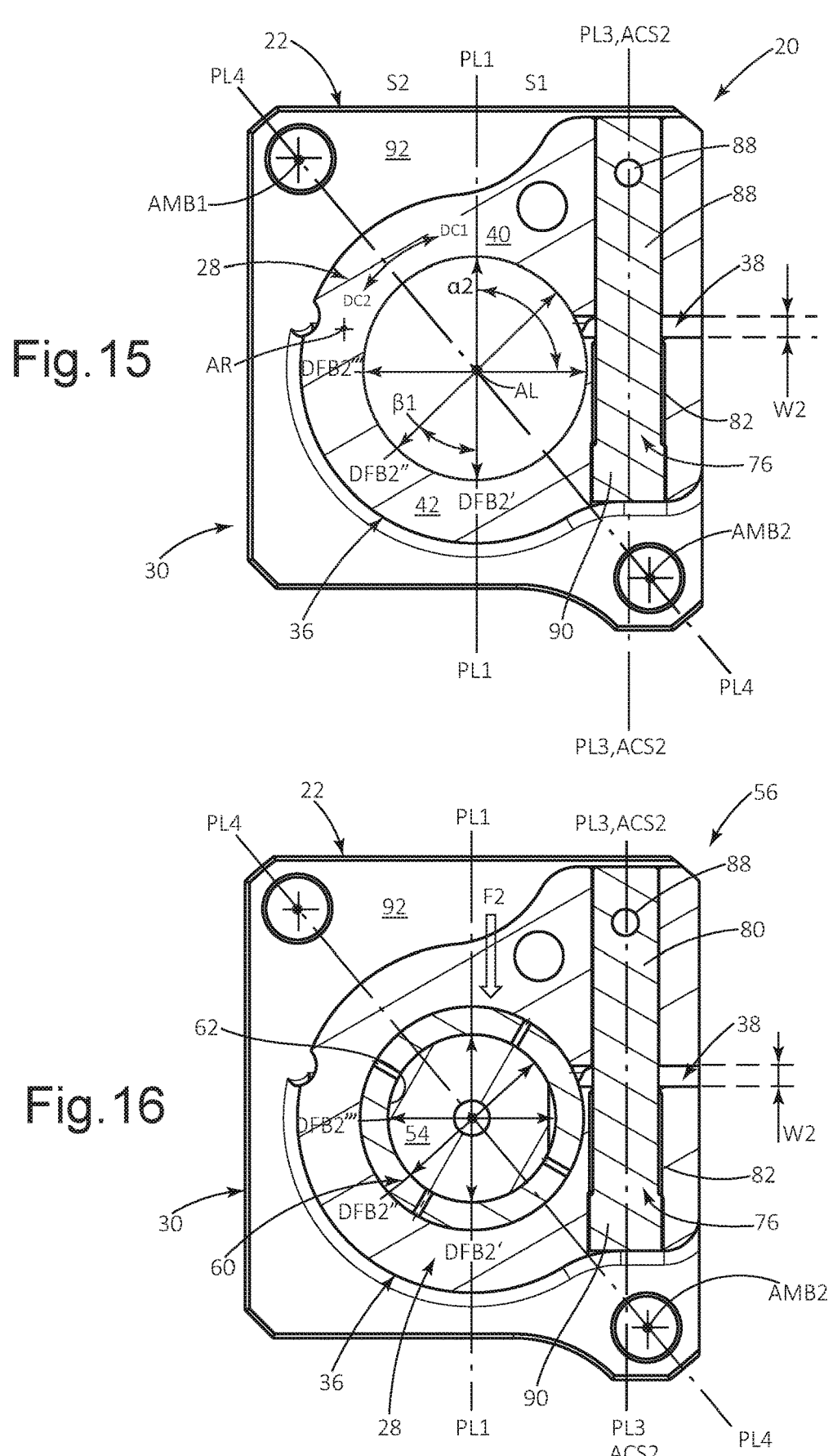
FIG. 15 is a cross-sectional view of the tool holder shown in FIG. 4, taken along the line XV-XV.
FIG. 16 is the cross-sectional view of the tool holder shown in FIG. 4, taken along the line XV-XV, with the radially expandable sleeve and the tool shank clampingly retained therein.

As shown in FIG. 15, in a cross-section taken in a second fixation plane PF2 perpendicular to the longitudinal axis AL and intersecting the primary slot 38, the fixation bore 34 has a fixation bore second primary diameter DFB2' measured parallel to the second clamping shaft axis ACS2 or an axial projection thereof.

Also as shown in FIG. 15, in the cross-section taken in the second fixation plane PF2, the fixation bore 34 has a fixation bore second secondary diameter DFB2" measured at a second fixation first rotational offset angle β1 of forty-five degrees from the fixation bore second primary diameter DFB2', and a fixation bore second tertiary diameter DFB2''' measured at a second fixation second rotational offset angle β2 of ninety degrees from the fixation bore second primary diameter DFB2'.

It should be appreciated that each of the fixation bore second primary, secondary and tertiary diameters DFB2', DFB2", DFB2''' contains and is measured via the longitudinal axis AL.

In a tool holder 20 in which the fixation jaw 40 is not resiliently displaced relative to the base jaw 42, apart from the circumferential portion of the fixation bore 34 being intersected by the primary slot 38, the fixation bore 34 may be circular and the fixation bore second primary, secondary and tertiary diameters DFB2', DFB2", DFB2''' may be equal.

Also, in a tool holder 20 in which the fixation jaw 40 is not resiliently displaced relative to the base jaw 42, by virtue of the fixation bore 34 being cylindrical it should be appreciated that the fixation bore second primary, secondary and tertiary diameters DFB2', DFB2", DFB2''' may be equal to the fixation bore first primary, secondary and tertiary diameters DFB1', DFB1", DFB1'''.

As shown in FIG. 7, the second clamping shaft axis ACS2 may be parallel to the first clamping shaft ACS1.

In some embodiments of the present invention, the second clamping shaft axis ACS2 may be contained in the second fixation plane PF2.

Also, in some embodiments of the present invention, the second fixation plane PF2 may be located forward of the secondary slot 64.

Further, in some embodiments of the present invention, the second fixation plane PF2 may be spaced apart from the first fixation plane PF1 and located forward or rearward thereof.

As shown in FIG. 7, the second fastening member 78 may extend along a second fastening member axis AFM2 and occupy a second fastening bore 84 in the fixation portion 28.

In some embodiments of the present invention, the second fastening bore 84 may be a threaded bore, and the second fastening member 78 may be threadingly retained in the second fastening bore 84.

It should be appreciated that apart from having different lengths, the first and second fastening members 26, 78 may be identical.

As shown in FIG. 7, the second fastening bore 84 may intersect the second clamping bore 82 and open out to the front fixation surface 32.

In some embodiments of the present invention, the front fixation surface 32 may be perpendicular to the longitudinal axis AL in the region where the second fastening bore 84 opens out to the front fixation surface 32.

It should be appreciated that by virtue of the second fastening bore 84 opening out to the front fixation surface 32, the second fastening bore 84 is configured to receive the second fastening member 78, which may thus be accessible (by an operator) from a location forward of the front fixation surface 32. Also, for such embodiments of the invention, it should be appreciated that despite the fixation bore 34 and the first and second fastening bores 48, 84 opening out to the front fixation surface 32, the fixation bore first primary diameter DFB1' may be greater than thirty percent of the first diameter D1, and in a front view of the holder body 22, as shown in FIG. 3, the fixation portion 28 may be radially compact.

In some embodiments of the present invention, the second fastening bore 84 may be located in the fixation jaw 40.

Also, in some embodiments of the present invention, the second fastening member axis AFM2 may be parallel to the longitudinal axis AL.

For embodiments of the invention in which the second fastening member axis AFM2 is parallel to the longitudinal axis AL and the second clamping shaft axis ACS2 is contained in the second fixation plane PF2, it should be appreciated that the second fastening member axis AFM2 is perpendicular to the second clamping shaft axis ACS2.

As shown in FIGS. 7 and 10, the first and second clamping shaft axes ACS1, ACS2 may be contained in a third longitudinal plane PL3 parallel to the longitudinal axis AL.

In some embodiments of the present invention, the first and second fastening member axes AFM1, AFM2 may be contained in the third longitudinal plane PL3.

In some embodiments of the present invention, rotation of the second fastening member 78 in a second fastening direction FD2 about the second fastening member axis AFM2 may cause the second fastening member 78 to operatively engage a second abutment surface 86 of the second clamping shaft 80 and the fixation bore second primary diameter DFB2' to decrease.

In a tool holder 20 in which the first fastening member 26 is rotated in the first fastening direction FD1 about the first fastening member axis AFM1 before the second fastening member 78 is rotated in the second fastening direction FD2 about the second fastening member axis AFM2, it should be appreciated that the fixation jaw 40 will have already undergone resilient displacement relative to the base jaw 42 and the fixation bore second primary diameter DFB2' will have already at least partially decreased as the fixation bore first primary diameter DFB1' decreases. In such instances, it should be appreciated that subsequent rotation of the second fastening member 78 in the second fastening direction FD2 about the second fastening member axis AFM2 may promote a further small decrease in the fixation bore second primary diameter DFB2', and as shown in FIG. 16, a second clamping force F2 may be applied to the tool shank 54 retained in the fixation bore 34.

For embodiments of the present invention in which the tool shank 54 is clampingly retained in the fixation bore 34 via the sleeve 60, differences between the fixation bore second primary, secondary and tertiary diameters DFB2', DFB2", DFB2''' following rotation of the second fastening member 78 in the second fastening direction FD2 about the second fastening member axis AFM2 are compensated for by the sleeve 60 such that the second clamping force F2 is circumferentially distributed around the tool shank 54, and the inner sleeve surface 62 having a substantially circular cross-sectional shape makes clamping contact therewith.

For embodiments of the present invention in which the first and second clamping shaft axes ACS1, ACS2 are contained in the first and second fixation planes PF1, PF2, respectively, and the second fixation plane PF2 is spaced apart from the first fixation plane PF1, it should be appreciated that the overall clamping force being applied to the tool shank 54 is longitudinally distributed along the fixation portion 28 by way of two longitudinally spaced apart clamping force components, namely, the first and second clamping forces F1, F2, thus providing more reliable clamping of the tool shank 54 in the fixation bore 34.

In some embodiments of the present invention, subsequent rotation of the second fastening member 78 in a second unfastening direction UD2 opposite to the second fastening direction FD2 about the second fastening member axis AFM2 may cause the second fastening member 78 to operatively disengage from the second abutment surface 86 of the second clamping shaft 80 and the fixation bore second primary diameter DFB2' to increase.

For instances in which the second fastening member 78 is rotated in the second unfastening direction UD2 about the second fastening member axis AFM2 before the first fastening member 26 is rotated in the first unfastening direction UD1 about the first fastening member axis AFM1, it should be appreciated that the fixation jaw 40 will remain resiliently displaced relative to the base jaw 42 and the fixation bore second primary diameter DFB2' may only undergo a small increase as the first clamping force F2 is released.

As shown in FIG. 7, the second abutment surface 86 may be disposed in a second abutment recess 88 in the second clamping shaft 80.

In some embodiments of the present invention, the second clamping member 76 may have a second clamping head 90 at one end of the second clamping shaft 80, and, as shown in FIG. 7, the second abutment recess 88 and the second clamping head 90 may be located on opposite sides of the primary slot 38.

Also, in some embodiments of the present invention, the second abutment surface 86 may generally face towards the second clamping head 90, much in the same manner that the first abutment surface 52 may generally face towards the first clamping head 68.

It should be appreciated that apart from the first and second clamping shafts 44, 80 having different lengths, the first and second clamping members 26, 76 may be identical.

In some embodiments of the present invention, the second clamping bore 82 may open out to a portion of the fixation envelope surface 36 associated with the base jaw 42, thus being configured to receive the second clamping member 76 via the base jaw 42.

As shown in FIGS. 1 to 7, the mounting portion 30 has front and rear mounting surfaces 92, 94 facing in the forward and rearward directions DF, DR, respectively.

In some embodiments of the present invention, the mounting portion 30 may include first and second mounting bores 96, 98 having first and second mounting bore axes AMB1, AMB2, respectively, and each of the first and second mounting bores 96, 98 may open out to the front and rear mounting surfaces 92, 94.

Also, in some embodiments of the present invention, the first and second mounting bore axes AMB1, AMB2 may be parallel to the longitudinal axis AL.

As shown in FIG. 3, in the front view of the holder body 22, the first and second mounting bores 96, 98 may be spaced apart by the fixation portion 28.

In some embodiments of the present invention, first and second mounting screws (not shown) may occupy the first and second mounting bores 96, 98, respectively, and threadingly engage first and second screw bores in the abovementioned static back plate, and the first and second mounting screws may be accessible from a location forward of the front mounting surface 92. For such embodiments of the present invention, it should be appreciated that the first fastening member 26 and the first and second mounting screws (occupying the first and second mounting bores 96, 98, respectively) may advantageously be accessible from the same location forward of the front mounting surface 92.

Also, for embodiments of the present invention in which the second fastening bore 84 opens out to the front fixation surface 32, it should be appreciated that the first and second fastening members 26, 78 and the first and second mounting screws may all advantageously be accessible from the same location forward of the front mounting surface 92.

As shown in FIG. 3, a fourth longitudinal plane PL4 may contain the first and second mounting bore axes AMB1, AMB2 and the longitudinal axis AL, and the first and second mounting bore axes AMB1, AMB2 may be equidistant from the longitudinal axis AL. For such embodiments of the present invention, it should be appreciated that the tool holder 20 may advantageously have two index positions on the static back plate, whereby indexing from a first index position to a second index position is achieved by rotating the tool holder 20 one hundred and eighty degrees about the longitudinal axis AL.

Figure 2:
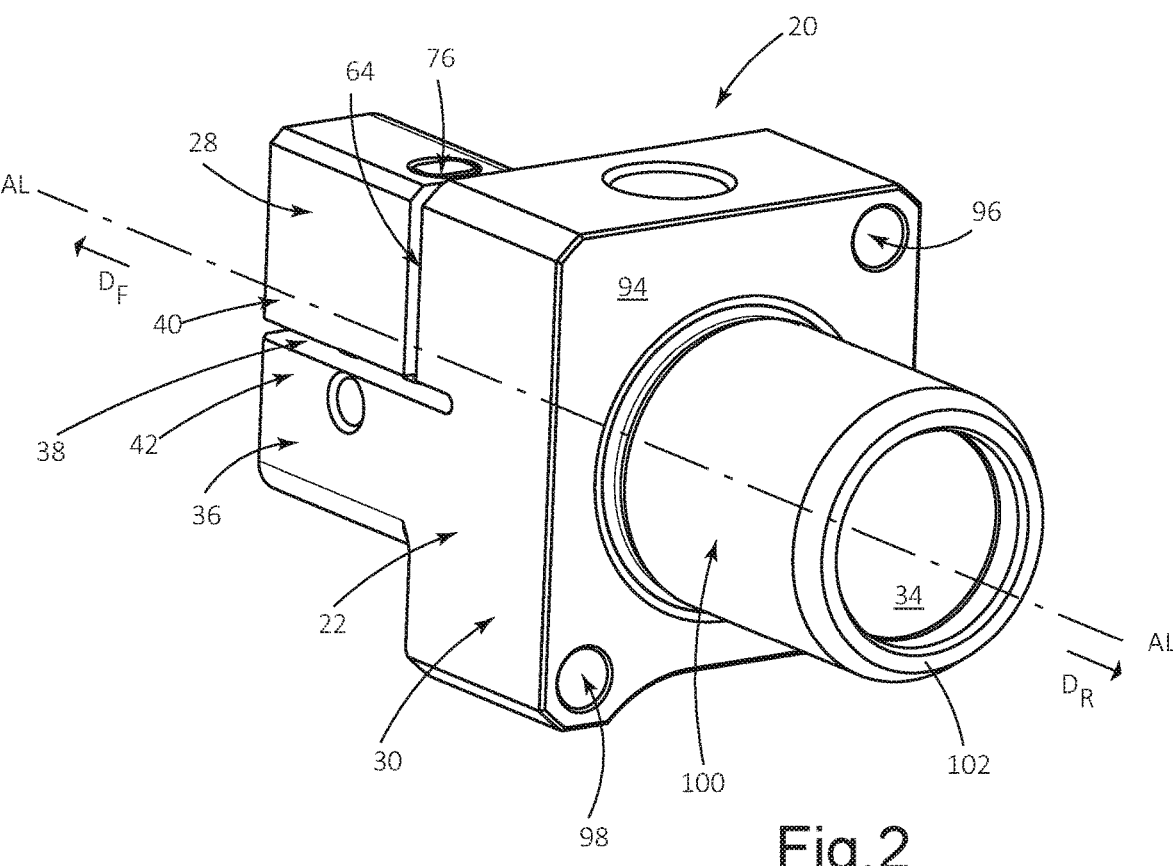
FIG. 2 is a second perspective view from the rear of the tool holder shown in FIG. 1.

As shown in FIG. 2, the mounting portion 30 may have a cylindrical mounting extension 100 protruding rearwardly from the rear mounting surface 94.

In some embodiments of the present invention, the fixation bore 34 may intersect an annular rear end surface 102 of the mounting extension 100.

Although the present invention has been described to a certain degree of particularity, it should be understood that various alterations and modifications could be made without departing from the spirit or scope of the invention as hereinafter claimed.

What is claimed is:

1. A tool holder (20) having a longitudinal axis (AL) defining a forward direction (DF) and a rear direction (DR) opposite to the forward direction (DF), the tool holder (20) comprising:
  a holder body (22),
  a first clamping member (24),
  a first fastening member (26),
  the holder body (22) having a fixation portion (28) and a mounting portion (30) located rearward of the fixation portion (28),
  the fixation portion (28) having a front fixation surface (32) facing in the forward direction (DF) and defining a frontmost surface of the fixation portion (28), a cylindrical fixation bore (34) intersecting the front fixation surface (32) and extending rearwardly therefrom along the longitudinal axis (AL), a fixation envelope surface (36) extending rearwardly from the front fixation surface (32), and a longitudinally extending primary slot (38) connecting the fixation bore (34) to the fixation envelope surface (36) and intersecting the front fixation surface (32),
  the first clamping member (24) having a first clamping shaft (44) extending along a first clamping shaft axis (ACS1), the first clamping shaft (44) occupying a first clamping bore (46) in the fixation portion (28) and traversing the primary slot (38), the first clamping bore

(46) being non-threaded and passing through the fixation envelope surface (36) and extending on both sides of the primary slot (38), the first fastening member (26) extending along a first fastening member axis (AFM1) and occupying a first fastening bore (48) in the fixation portion (28), the first fastening bore (48) intersecting the first clamping bore (46), extending along the longitudinal axis (AL), and opening out to the front fixation surface (32), the first fastening bore (48) being threaded, and the fixation portion (28) further comprising a resiliently displaceable fixation jaw (40) and a static base jaw (42) spaced apart by the primary slot, wherein in a cross-section taken in a first fixation plane (PF1) perpendicular to the longitudinal axis (AL) and intersecting the primary slot (38), the fixation bore (34) has a fixation bore first primary diameter (DFB1') measured parallel to the first clamping shaft axis (ACS1), and wherein:

rotation of the first fastening member (26) in a first fastening direction (FD1) about the first fastening member axis (AFM1) causes the first fastening member (26) to operatively engage a first abutment surface (52) of the first clamping shaft (44) and the fixation bore first primary diameter (DFB1') to decrease, subsequent rotation of the first fastening member (26) in a first unfastening direction (UD1) opposite to the first fastening direction (FD1) about the first fastening member axis (AFM1) causes the first fastening member (26) to operatively disengage from the first abutment surface (52) of the first clamping shaft (44) and the fixation bore first primary diameter (DFB1') to increase, the fixation jaw (40) is spaced apart from the mounting portion (30) by a secondary slot (64) transverse to the primary slot (38), the base jaw (42) merges with the mounting portion (30), and the secondary slot (64) communicates with the primary slot (38).

2. The tool holder (20) according to claim 1, wherein:

the first fastening member axis (AFM1) is parallel to the longitudinal axis (AL).

3. The tool holder (20) according to claim 1, wherein:

the first clamping shaft axis (ACS1) is contained in the first fixation plane (PF1).

4. The tool holder (20) according to claim 1, wherein:

the fixation jaw (40) is resiliently displaceable about a resilient axis of rotation (AR) extending parallel to the longitudinal axis (AL).

5. The tool holder (20) according to claim 4, wherein in the cross-section taken in the first fixation plane (PF1):

the resilient axis of rotation (AR) is located at a minimum fixation wall thickness (TWMIN) between the fixation envelope surface (36) and the fixation bore (34).

6. The tool holder (20) according to claim 1, wherein:

in the cross-section taken in the first fixation plane (PF1), the fixation bore (34) has a fixation bore first secondary diameter (DFB1") measured at a first fixation first rotational offset angle (α1) of forty-five degrees from the fixation bore first primary diameter (DFB1'), and wherein:

rotation of the first fastening member (26) in the first fastening direction (FD1) about the first fastening member axis (AFM1) causes the fixation bore first secondary diameter (DFB1") to decrease, and subsequent rotation of the first fastening member (26) in the first unfastening direction (UD1) about the first fastening member axis (AFM1) causes the fixation bore first secondary diameter (DFB1") to increase.

7. The tool holder (20) according to claim 1, wherein:

in a front view of the holder body (22), an imaginary first circle (C1) having a first diameter (D1) circumscribes the fixation portion (28), and the fixation bore first primary diameter (DFB1') is greater than thirty percent of the first diameter (D1).

8. The tool holder (20) according to claim 1, wherein the fixation bore (34) is a through bore extending the entire longitudinal extent of the holder body (22).

9. The tool holder (20) according to claim 1, wherein:

the first fastening member (26) has first and second fastening ends (70, 72) and a threaded fastening portion (74) extending along the first fastening member axis (AFM1) between the first and second fastening ends (70, 72).

10. The tool holder (20) according to claim 9, wherein:

the first fastening end (70) has a recessed or protruding torque transfer geometry, accessible from a location forward of the front fixation surface (32).

11. The tool holder (20) according to claim 1, further comprising a second clamping member (76) and a second fastening member (78), the second clamping member (76) having a second clamping shaft (80) extending along a second clamping shaft axis (ACS2), the second clamping shaft (80) occupying a second clamping bore (82) in the fixation portion (28) and traversing the primary slot (38), and the second fastening member (78) extending along a second fastening member axis (AFM2) and occupying a second fastening bore (84) in the fixation portion (28), wherein in a cross-section taken in a second fixation plane (PF2) perpendicular to the longitudinal axis (AL) and intersecting the primary slot (38), the fixation bore (34) has a fixation bore second primary diameter (DFB2') measured parallel to the second clamping shaft axis (ACS2), wherein the second fastening bore (84) intersects the second clamping bore (82) and opens out to the front fixation surface (32), and wherein:

rotation of the second fastening member (78) in a second fastening direction (FD2) about the second fastening member axis (AFM2) causes the second fastening member (78) to operatively engage a second abutment surface (86) of the second clamping shaft (80) and the fixation bore second primary diameter (DFB2') to decrease, and subsequent rotation of the second fastening member (78) in a second unfastening direction (UD2) opposite to the second fastening direction (FD2) about the second fastening member axis (AFM2) causes the second fastening member (78) to operatively disengage from the second abutment surface (86) of the second clamping shaft (80) and the fixation bore second primary diameter (DFB2') to increase.

12. The tool holder (20) according to claim 11, wherein:

the second fastening member axis (AFM2) is parallel to the longitudinal axis (AL).

13. The tool holder (20) according to claim 11, wherein:

the second clamping shaft axis (ACS2) is contained in the second fixation plane (PF2).

14. The tool holder (20) according to claim 11, wherein:
the first and second clamping shaft axes (ACS1, ACS2)
    are contained in a third longitudinal plane (PL3) par-
    allel to the longitudinal axis (AL).

15. The tool holder (20) according to claim 14, wherein:
the first and second fastening member axes (AFM1,
    AFM2) are contained in the third longitudinal plane
    (PL3).

16. The tool holder (20) according to claim 1, wherein:
the mounting portion (30) has front and rear mounting
    surfaces (92, 94) facing in the forward and rearward
    directions (DF, DR), respectively,
the mounting portion (30) includes first and second
    mounting bores (96, 98) having first and second mount-
    ing bore axes (AMB1, AMB2), respectively, and
each of the first and second mounting bores (96, 98) open
    out to the front and rear mounting surfaces (92, 94).

17. The tool holder (20) according to claim 16, wherein:
a fourth longitudinal plane (PL4) contains the first and
    second mounting bore axes (AMB1, AMB2) and the
    longitudinal axis (AL), and
the first and second mounting bore axes (AMB1, AMB2)
    are equidistant from the longitudinal axis (AL).

18. The tool holder (20) according to claim 1, further
comprising a radially expandable sleeve (60) occupying the
fixation bore (34).

19. A tool holder body (22) having a longitudinal axis
(AL) defining a forward direction (DF) and a rear direction
(DR) opposite to the forward direction (DF), the tool holder
body (22) comprising:
    a mounting portion (30); and
    a fixation portion (28) located forward of the mounting
        portion (30), the fixation portion comprising:
    a front fixation surface (32) facing in the forward direc-
        tion (DF) and defining a frontmost surface of the
        fixation portion (28);
    a cylindrical fixation bore (34) intersecting the front
        fixation surface (32) and extending rearwardly there-
        from along the longitudinal axis (AL), the cylindrical
        fixation bore (34) configured to receive a tool shank;
    a fixation envelope surface (36) extending rearwardly
        from the front fixation surface (32);
    a longitudinally extending primary slot (38) connecting
        the fixation bore (34) to the fixation envelope surface
        (36) and intersecting the front fixation surface (32);
    a non-threaded first clamping bore (46) passing though
        the fixation envelope surface (36) and extending on
        both sides of the primary slot (38); and
    a threaded first fastening bore (48) extending along the
        longitudinal axis (AL), intersecting the first clamping
        bore (46), and opening out to the front fixation surface
        (32), wherein:
        the fixation portion (28) has a resiliently displaceable
            fixation jaw (40) and a static base jaw (42);
        the fixation jaw (40) and the base jaw (42) are spaced
            apart by the primary slot (38);
        the fixation jaw (40) is spaced apart from the mounting
            portion (30) by a secondary slot (64) transverse to
            the primary slot (38);
        the base jaw (42) merges with the mounting portion
            (30); and:
        the secondary slot (64) communicates with the primary
            slot (38).

20. The tool holder body (22) according to claim 19,
further comprising:
    a non-threaded second clamping bore (82), parallel to the
        non-threaded first clamping bore (46), and passing through the fixation envelope surface (36) and extend-
        ing on both sides of the primary slot (38); and
    a threaded second fastening bore (84) extending along the
        longitudinal axis (AL), intersecting the second clamp-
        ing bore (82) and opening out to the front fixation
        surface (32).

21. A tool holder (20) comprising:
the tool holder body (22) according to claim 19;
a first clamping member (24) having a first clamping shaft
    (44) extending along a first clamping shaft axis
    (ACS1), the first clamping shaft (44) occupying the
    first clamping bore (46) and traversing the primary slot
    (38); and
a first fastening member (26) extending along a first
    fastening member axis (AFM1) and occupying the first
    fastening bore (48);
wherein:
in a cross-section taken in a first fixation plane (PF1)
    perpendicular to the longitudinal axis (AL) and inter-
    secting the primary slot (38), the fixation bore (34) has
    a fixation bore first primary diameter (DFB1') mea-
    sured parallel to the first clamping shaft axis (ACS1);
rotation of the first fastening member (26) in a first
    fastening direction (FD1) about the first fastening
    member axis (AFM1) causes the first fastening member
    (26) to operatively engage a first abutment surface (52)
    of the first clamping shaft (44) and the fixation bore first
    primary diameter (DFB1') to decrease, and
subsequent rotation of the first fastening member (26) in
    a first unfastening direction (UD1) opposite to the first
    fastening direction (FD1) about the first fastening
    member axis (AFM1) causes the first fastening member
    (26) to operatively disengage from the first abutment
    surface (52) of the first clamping shaft (44) and the
    fixation bore first primary diameter (DFB1') to
    increase.

22. A tool holder body (22) having a longitudinal axis
(AL) defining a forward direction (DF) and a rear direction
(DR) opposite to the forward direction (DF), the tool holder
body (22) comprising:
    a mounting portion (30); and
    a fixation portion (28) located forward of the mounting
        portion (30), the fixation portion comprising:
    a front fixation surface (32) facing in the forward direc-
        tion (DF) and defining a frontmost surface of the
        fixation portion (28);
    a cylindrical fixation bore (34) intersecting the front
        fixation surface (32) and extending rearwardly there-
        from along the longitudinal axis (AL), the cylindrical
        fixation bore (34) configured to receive a tool shank;
    a fixation envelope surface (36) extending rearwardly
        from the front fixation surface (32);
    a longitudinally extending primary slot (38) connecting
        the fixation bore (34) to the fixation envelope surface
        (36) and intersecting the front fixation surface (32);
    a non-threaded first clamping bore (46) passing though
        the fixation envelope surface (36) and extending on
        both sides of the primary slot (38); and
    a threaded first fastening bore (48) extending along the
        longitudinal axis (AL), intersecting the first clamping
        bore (46), and opening out to the front fixation surface
        (32), wherein the mounting portion (30) includes a
        front mounting surface (92) facing in the forward
        direction (DF) and defining a plane orthogonal to the longitudinal axis (AL), the fixation portion extending forward from the front mounting surface (92) of the mounting portion (30).

\* \* \* \* \*